Giles M. Goss. Feed-Trough.
No. 123,012.
Patented Jan. 23, 1872.
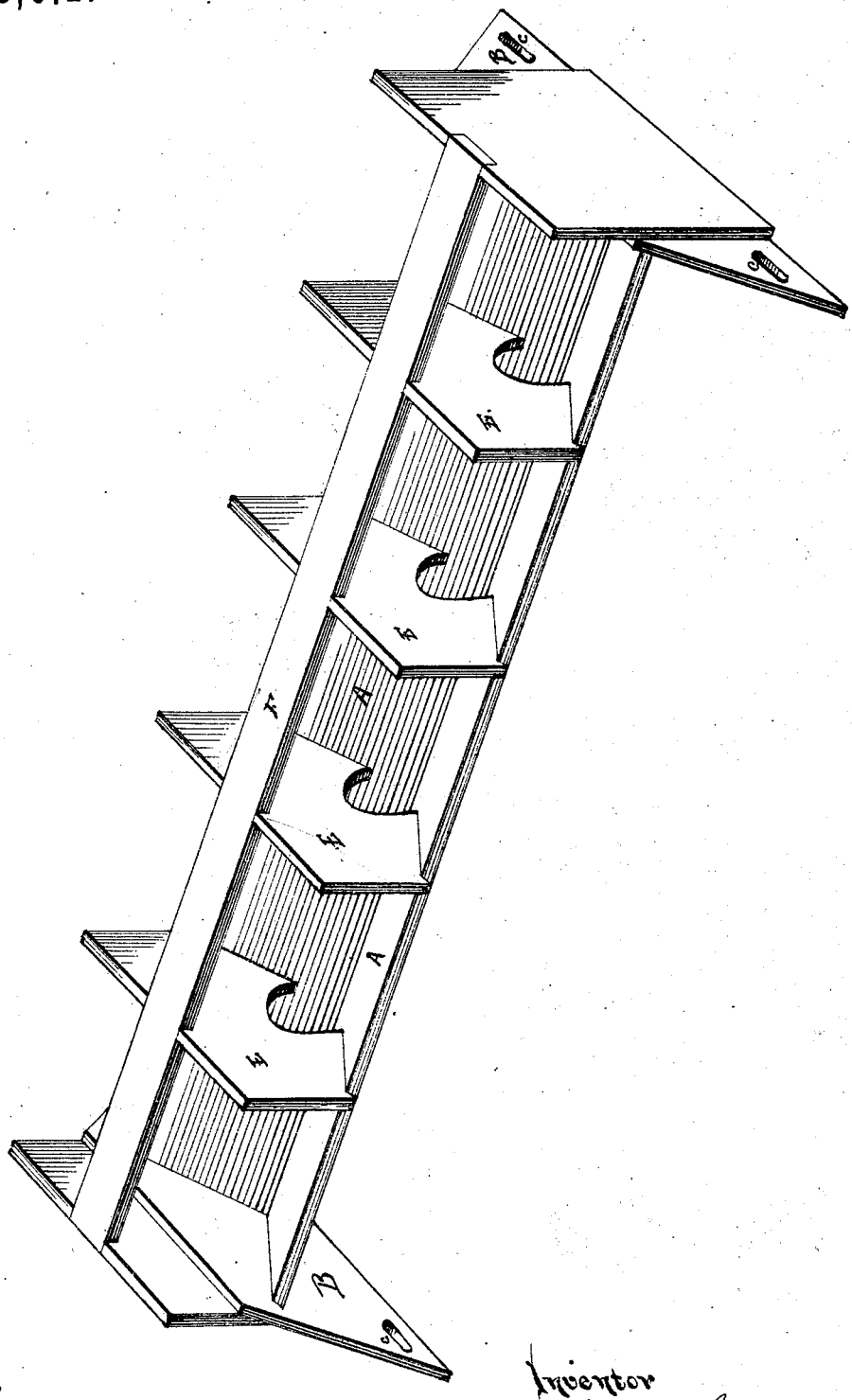

123,012

UNITED STATES PATENT OFFICE.

GILES M. GOSS, OF BLOOMFIELD, IOWA, ASSIGNOR TO HIMSELF AND EPHRAIM H. WATSON.

IMPROVEMENT IN FEED-TROUGHS.

Specification forming part of Letters Patent No. 123,012, dated January 23, 1872.

SPECIFICATION.
*To all whom it may concern:*

Be it known that I, GILES M. GOSS, of Bloomfield, in the county of Davis and State of Iowa, have invented a new and useful Improvement in Feeding-Troughs; and I do hereby declare the following to be a full, clear, and exact description of the same, reference being had to the accompanying drawing, in which the figure represents a perspective view of my invention.

My improvement consists in a portable feeding-trough provided with handles for convenient transportation, and divided by transverse partitions into separate stalls, to which animals may approach from either side without being able to cross the trough or to get into it to foul the food.

That others may fully understand my improvement, I will particularly describe it.

A is the trough, which may be constructed of boards, or in any convenient or desirable way. At each end I secure a transverse piece, B, which is made to project on either side, to form a base upon which the trough shall stand, and hand-holes C are made in the pieces B near their ends, for the convenient application of the hands when the trough is to be removed from one place to another, as it is frequently desirable to remove it to prevent the excessive trampling of the stock at one spot. At regular intervals, determined by the kind of stock to be fed, I place transverse partitions E across the trough A, so that, when feeding, one animal cannot see his next neighbor, and will not, therefore, be tempted to interfere with him or drive him away. The partitions also prevent the animals from getting into the trough, as hogs are always desirous to do, and fouling it. The partitions E do not reach entirely to the bottom of the trough; and the slop or liquid food may then flow from one end to the other, and each animal will obtain his proper share without a special distribution. The partitions E are high enough to receive along their tops a rail, F, which will prevent any animal from crossing the trough, but will permit free access from either side.

I am aware that feeding-troughs have been make with partitions; but they have always been constructed as permanent structures, and, so far as I know, only accessible at one side. This is adapted to regular feeding-yards, but not to the use of the farmer who desires to feed his stock at one place or another, as his convenience may require.

Having now described my improvement, what I claim as new is—

The portable trough A, constructed with partitions E and rail F, in the manner set forth.

GILES M. GOSS.

Witnesses:
HOWARD WILLEY,
M. B. HORN.